(12) United States Patent
Axelbaum et al.

(10) Patent No.: US 10,193,132 B2
(45) Date of Patent: Jan. 29, 2019

(54) SYNTHESIS OF SUBMICROMETER TO MICROMETER-SIZED CATHODE MATERIALS

(75) Inventors: Richard Louis Axelbaum, St. Louis, MO (US); Xiaofeng Zhang, St. Louis, MO (US)

(73) Assignee: Washington University, St. Louis, MO (US)

( * ) Notice: Subject to any disclaimer, the term of this patent is extended or adjusted under 35 U.S.C. 154(b) by 362 days.

(21) Appl. No.: 13/811,448

(22) PCT Filed: Aug. 2, 2011

(86) PCT No.: PCT/US2011/046333
§ 371 (c)(1),
(2), (4) Date: May 31, 2013

(87) PCT Pub. No.: WO2012/018863
PCT Pub. Date: Feb. 9, 2012

(65) Prior Publication Data
US 2013/0273430 A1    Oct. 17, 2013

Related U.S. Application Data

(60) Provisional application No. 61/369,956, filed on Aug. 2, 2010.

(51) Int. Cl.
*H01M 4/131* (2010.01)
*H01M 4/525* (2010.01)
*C01G 45/00* (2006.01)
*H01M 4/505* (2010.01)
*B82Y 30/00* (2011.01)
*C01G 45/12* (2006.01)

(52) U.S. Cl.
CPC ............ *H01M 4/131* (2013.01); *B82Y 30/00* (2013.01); *C01G 45/00* (2013.01); *H01M 4/505* (2013.01); *H01M 4/525* (2013.01); *C01G 45/1228* (2013.01); *C01G 45/1235* (2013.01); *C01G 45/1242* (2013.01); *C01P 2002/32* (2013.01); *C01P 2002/72* (2013.01); *C01P 2004/03* (2013.01); *C01P 2004/04* (2013.01); *C01P 2004/32* (2013.01); *C01P 2004/61* (2013.01); *C01P 2004/62* (2013.01); *C01P 2004/64* (2013.01)

(58) Field of Classification Search
CPC .. H01M 4/505; H01M 4/525; C01G 45/1228; C01G 45/1235; C01G 45/1242; C01P 2002/32; C01P 2002/34; C01P 2002/36
See application file for complete search history.

(56) References Cited

U.S. PATENT DOCUMENTS

| 6,225,007 B1 | 5/2001 | Horne et al. | |
|---|---|---|---|
| 6,902,745 B2 | 6/2005 | Lee et al. | |
| 2013/0045158 A1* | 2/2013 | Katusic | C01G 1/02 |
| | | | 423/594.4 |
| 2013/0101500 A1* | 4/2013 | Nikolov | B82Y 30/00 |
| | | | 423/622 |

OTHER PUBLICATIONS

Taniguchi et al., "Synthesis of spherical LiMn2O4 microparticles by a combination of spray pyrolysis and drying method", Powder Technology, vol. 181, Issue 3, Feb. 12, 2008, pp. 228-236.*
Jang et al., "Synthesis of Lithium-Cobalt Oxide Nanoparticles by Flame Spray Pyrolysis", Aerosol Science and Technology, 38:1027-1032, 2004.*
Doan et al., "Preparation of carbon coated LiMnPO4 powders by a combination of spray pyrolysis with dry ball-milling followed by heat treatment", Advanced Powder Technology 21:187-196, 2010.*
Notification of Transmittal of the International Search Report and the Written Opinion of International Application No. PCT/US2011/046333; dated Mar. 22, 2012; 16 pages.
Taniguchi, I. et al., Synthesis of Spherical LiMn2O4 Microparticles by a Combination of Spray Pyrolysis and Drying Method, Power Technology, May 18, 2007, pp. 228-236, vol. 181.
Ernst, F.O. et al., Electrochemically Active Flame-Made Nanosized Spinels: LiMn2O4, Li4Ti5O12 and LiFe5O8, Materials Chemistry and Physics, Aug. 2006, pp. 372-378, vol. 101.
Patey, T.J. et al., Electrochemistry of LiMn2O14 Nanoparticles Made by Flame Spray Pyrolysis, Physical Chemistry Chemical Physics, Mar. 25, 2009, pp. 3756-3761, vol. 11.
Oh, S.W. et al., Synthesis and Characterization of Spherical Morphology [NiO.44CoO.2MnO.4] 304 Materials for Lithium Secondary Batteries, Journal of Power Sources, Feb. 17, 2006, pp. 558-562, vol. 160.

* cited by examiner

*Primary Examiner* — Ladan Mohaddes
(74) *Attorney, Agent, or Firm* — Armstrong Teasdale LLP (57) ABSTRACT

A method of producing submicrometer- to micrometer-sized spherical particles, the method comprising dissolving a lithium salt and a metal salt in water or alcohol forming a precursor solution, spraying the precursor solution to form fine aerosolized droplets, flowing the aerosolized droplets into a pyro lysis flame producing submicrometer- to micrometer-sized spherical particles. The submicrometer- to micrometer-sized spherical lithium-metal oxide powders produced are cathode materials for Li-ion batteries.

20 Claims, 8 Drawing Sheets

SYNTHESIS OF SUBMICROMETER TO MICROMETER-SIZED CATHODE MATERIALS

CROSS-REFERENCE TO RELATED APPLICATIONS

This application claims the benefit of U.S. Provisional Patent Application Ser. No. 61/369,956 filed Aug. 2, 2010, all of which is hereby incorporated by referenced in its entirety.

STATEMENT REGARDING FEDERALLY SPONSORED RESEARCH AND DEVELOPMENT

This invention was made under NSF grant 0928964. The government has certain rights in the invention.

BACKGROUND

Aspects of the disclosure relate generally to cathode materials and, more particularly, methods for continuously synthesizing submicrometer- to micrometer-sized cathode materials for lithium (Li) ion rechargeable batteries.

Li-ion rechargeable-batteries are needed as high-energy storage devices for electric vehicles (EVs), portable devices and intermittent energy storage facilities for solar and wind energy. In a Li-ion battery, Li migrates between the cathode and anode during charge and discharge. The anode material is normally porous carbon (e.g., graphite), and the cathode materials are normally transition metal oxides, such as layered $LiMO_2$. (M=Co, Ni, Mn), spinel $LiMn_2O_4$ and their derivatives (J. Electrochem. Soc. 1992, 139, 937-948; Chem. Rev. 2004, 104, 4271-4301). Although lithium cobalt oxide ($LiCoO_2$) has been commercialized as a cathode material for Li-ion rechargeable batteries, the toxicity and high cost of Co have driven the development of new cathode materials and low-cost processes to manufacture them.

BRIEF SUMMARY

An embodiment of the present disclosure is a method of producing a spherical lithium transition metal oxide with a diameter in the sub-micrometer to micrometer size, specifically in the range between 0.01 and 100 micrometers, and more specifically in the range between 0.1 and 10 micrometers, wherein the method is continuous. The method comprises dissolving a lithium salt and a metal salt in water or alcohol forming a lithium metal solution, spraying the lithium solution to form fine aerosolized droplets, flowing the aerosolized droplets into a pyrolysis flame producing submicrometer-sized to micrometer-sized spherical particles.

DETAILED DESCRIPTION

Spinel lithium manganese oxide $LiMn_2O_4$ and its derivatives have gained attention as an alternative to lithium cobalt oxide. Spinel $LiMn_2O_4$ has many desirable advantages, including a high rate performance due to its 3-D framework, low cost, low toxicity, and simplicity of preparation.

However, severe capacity fading (irreversible capacity loss) during charge/discharge at 3-4 V has limited its commercial potential. To address this problem, the Mn cation can be partially substituted with Li or another metal, forming doped spinel $LiM_xMn_{2-x}O_4$ (where $0 \le x \le \frac{1}{3}$, M=Li, Ni, Co, Cr, and Al, etc.). This improves the cycling performance at 4 V, however, notable discharge capacity loss will occur because of the inactivity of these metal dopants at 4 V. Recently, it has been reported that with significant increases in the substitution of Mn (i.e., x=0.5) with some transition metals, the doped spinel shows a higher working potential near 5 V and also has good discharge capacity retention. Among the 5 V spinels, $LiNi_{0.5}Mn_{1.5}O_4$ ($Ni^{2+}$, $Mn^{4+}$) has drawn interest due to its desirable electrochemical characteristics: high capacity (i.e., about 130 to 140 mAh $g^{-1}$), working voltage plateau at about 4.7 V and good cycling performance at elevated charge/discharge rates.

The high-voltage plateau of $LiNi_{0.5}Mn_{1.5}O_4$ during cycling is known to be the result of the $Ni^{2+}/Ni^{4+}$ redox couple, compared to the $Mn^{3+}/Mn^{4+}$ redox couple in the traditional 4 V spinels. $LiNi_{0.5}Mn_{1.5}O_4$ has two stable crystallographic structures: disordered Fd$\bar{3}$m space group (SG) and ordered P4$_3$32 SG, which are stable at different synthetic conditions (J. Ceram. Soc. Jpn 2002, 110, 501-505; Chem. Mater. 2004, 16, 906-914; J. Electrochem. Soc. 2006, 153, A1345-A1352). It has been verified that micrometer-sized disordered spinel-$LiNi_{0.5}Mn_{1.5}O_4$ shows better cycling performance at high-discharge rate than the ordered structure.

The conventional approach to synthesis of these cathode materials is the solid-state reaction of a mixture of lithium and manganese precursors at high temperature. However, this approach is not likely to be able to produce powders that have nanostructured features due to the long calcination that is required (J. Ceram. Soc. Jpn 2002, 110, 501-505). Herein, nanostructure means that the "primary" particles or crystallites within the "secondary" particles are in the nanometer size range (5 nm to 500 nm). Recently, many solution-phase methods were developed to synthesize nanostructured submicrometer- to micrometer-sized powders, including sol-gel methods, the Pechine process, and the molten-salt method (Ionics 2006, 12, 117-126; Chem. Mater. 2006, 18, 3585-3592). A disadvantage of these processes is that they are complicated and time consuming. Furthermore, none of them have been shown to deliver continuous, large-scale production of submicrometer to micrometer-sized cathode-materials. Recently, ultrasonic spray-pyrolysis has been used to produce lithium transition-metal-oxide cathode-materials continuously for Li-ion batteries (Electrochimica Acta 2004, 50, 431-434; Solid State Ionics 2002, 146, 239-247; Key Eng. Mater. 2009, 388, 85-88). The powders show homogeneous morphology and good size distribution. However, an external heat source (heated wall) is required for spray pyrolysis and this can lead to a non-uniform temperature distribution and non-uniform product when scaled up (Adv. Powder Technol. 2004, 15, 397-403). On the other hand, flame-assisted spray pyrolysis has the potential of being a valuable process to produce cathode-materials continuously without the requirement of external heating.

Flame synthesis has been widely used to produce powders of carbon black, metal oxides ($TiO_2$, $SiO_2$, and $Y_2O_3$:Eu) (J. Mater. Res. 1997, 12, 1031-1042; Chem. Eng. Technol. 2001, 24, 583-596; J. Mater. Res. 2005, 20, 2960-2968), pure metals and non-oxide ceramics (Ti, $TiB_2$, AlN) (Metall. Mater. Trans. 1997, B 28, 1199-1211; Proc. Combust. Inst. 1996, 26, 1891-1897). In the past few years, flame techniques have been applied to synthesize oxides of multicomponent metal oxide powders for energy applications. Perovskite-type compounds have been produced by flame aerosol synthesis for application in oxygen-separation membranes (J. Membr. Sci. 2007, 291, 172-179) and by flame hydrolysis to produce catalyst particles for catalytic combustion (Appl. Catal. 2002, B 38, 29-37; J. Catal. 2005, 236, 251-261). Recently, it has been reported that lithium transition-metal-oxide cathode materials for Li-ion batteries can be produced via flame synthesis. Jang et al. have synthesized $LiCoO_2$ nanoparticles via flame spray pyrolysis (FSP) using hydrogen as the fuel (Aerosol Sci. Technol. 2004, 38, 1027-1032). However, the electrochemical properties of the as-synthesized $LiCoO_2$ nanoparticles were not evaluated in that work. Recently, Pratsinis et al. developed an alternative FSP process to produce spinel-$LiMn_2O_4$ cathode materials using liquid-phase fuels (Mater. Chem. Phys. 2007, 101, 372-378). In this process, metallic-organic compounds were dissolved in an organic solvent to serve as the precursor. The as-produced spinel-$LiMn_2O_4$ showed a good rate capability at 4 V. Nonetheless, the commercial viability of the FSP process is highly dependent on the price, availability, and compatibility of the metallic-organic precursor compounds and solvents. In the present work, a flame-assisted spray technology (FAST) is developed to produce spherical powders using low-cost metal-salt precursors.

An embodiment of the present disclosure, which is a method of continuously synthesizing submicrometer- to micrometer-sized particles, is provided. Such particles are suitable for Li-ion battery cathodes. The method comprises dissolving Li and/or other metal salts in water or alcohol to make a precursor solution; spraying or aerosolizing the precursor solution to form fine droplets; and flowing the fine droplets into a pyrolysis flame, wherein the fine droplets transform into submicrometer- to micrometer-sized spherical particles. The peak temperature of the flame is about 1200° C. or below, which is lower than the temperature for other known existing flame processes for making powders for Li-ion batteries. The flame supplies the heat for particle formation, and thus no additional heating is required, and consequently, the method is less energy intensive than a process that requires external heating.

An embodiment of the present disclosure is a method of producing submicrometer- to micrometer-sized, spherical-shaped cathode materials for lithium ion batteries, the method comprising: dissolving a lithium salt and a metal salt in water or alcohol forming a lithium metal precursor solution, spraying the precursor solution to form fine aerosolized droplets, flowing the aerosolized droplets in a carrier medium into a pyrolysis flame producing submicrometer- to micrometer-sized spherical particles. The submicrometer- to micrometer-sized spherical particles produced are a lithium-metal-oxide with a formula of $Li_\alpha M'_\beta O_\gamma$, wherein α is $0 \leq \alpha \leq 1$; β is $0 \leq \beta \leq 2$; and γ is $0 \leq \gamma \leq 4$. The lithium salt is selected from the group consisting of lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, lithium phosphate, or a mixture of any two or more thereof. The metal salt has a formula of $M'_\delta X'_\varepsilon$. M' is selected from a group consisting of Ni, Co, Mn, Al, Mg, Fe, Cu, Zn, V, Mo, Nb, Cr, Si, Ti, Zr, or a mixture of any two or more thereof. X' is selected from a group consisting of $NO_3^-$, $SO_4^{2-}$, $CO_3^{2-}$, $PO_4^{3-}$, $F^-$, $Cl^-$, $Br^-$, $I^-$, or a mixture of any two or more thereof with δ being $0 \leq \delta \leq 3$; and ε being $0 \leq \varepsilon \leq 3$. The aerosolized droplets are flowing in an environment of high temperature in the range of 800° C. to 1700° C. The carrier medium is a gas selected from the group consisting of $N_2$, $O_2$, Ar, He, Ne, Xe, Kr, $H_2$, $SO_2$, $NO_2$, $NO_3$, $O_3$, $CO_2$, CO, $H_2O$, $C_aH_bO_cN_d$ or a mixture of any two more thereof. The method is continuous and no external heat source is required. The spherical particles can be calcined for a certain time between 1 second to 100 hours, followed by slow or rapid cooling. The method results in about 50% of the particles produced being spherical. More preferably, the method results in about 80% of the particles produced being spherical. The spherical particles are polycrystalline or single crystalline, and the spherical particles are small primary particles.

An embodiment of the present disclosure is a method of producing nearly spherical lithium transition metal oxide particles with diameters in the submicrometer- to micrometer-size, specifically in the range between 0.01 and 100 micrometers, and more specifically in the range between 0.1 and 10 micrometers, wherein the method is effectively continuous. The method comprises dissolving a lithium salt and a metal salt in water or alcohol forming a precursor solution, spraying the precursor solution to form fine aerosolized droplets, flowing the aerosolized droplets into a pyrolysis flame producing the submicrometer- to micrometer-sized spherical particles.

In an embodiment, the submicrometer- to micrometer—sized spherical particles produced are spinel lithium manganese oxide. The lithium salt is a lithium nitrate and the metal salt is a manganese nitrate.

In an embodiment, the method produces spherical particles that are 50% spherical, or more preferably 80% spherical. Spherical is a term of art as being sphere-like. Spherical is a conformation that is suitable for cathode materials in a Li-ion battery as the particles can be packed tightly. The surface of the spherical particles can be smooth, porous and facet.

In another embodiment, the method is continuous with no external heat source used.

The process is continuous means that the spherical lithium transition metal oxide can be produced in the flame in a continuous manner. The synthesis process is continuous. The calcination/annealing step is a post-treatment step, and it is applied to the current materials from the flame. However, this step may not be necessary as new materials come up. In addition, considering the solid-state reaction and wet-chemistry processes, they are pure batch process in general. From these aspects, the flame is considered as a continuous process for powder synthesis.

The process requires no external heat means that the pyrolysis flame supplies the heat for particle formation, and thus no additional heating is required, and consequently, the method is less energy intensive than a process that requires additional external heating, e.g., from electrical resistive heating.

In another embodiment, a method of continuously synthesizing submicrometer- and micrometer-sized particles is provided. Such particles are suitable for Li-ion battery cathodes. The method comprises dissolving Li and other metal salts in water or alcohol to make a precursor solution, spraying or aerosolizing the precursor solution to form fine droplets; and flowing the fine droplets into a pyrolysis flame, wherein the fine droplets transform into submicrometer- to micrometer-sized spherical particles. The peak temperature of the flame is about 1200° C. or below, which is lower than the temperature for other known existing flame processes for making powders for Li-ion batteries.

In another embodiment, a method for continuously synthesizing submicrometer- to micrometer-sized cathode materials is provided. The method includes dissolving metal nitrates in a combustible solvent to form a precursor solution, aerosolizing the precursor solution with an atomizing gas, mixing a fuel with the aerosolized precursor to form a mixture of fuels, precursors and atomizing gas, introducing the mixture into a jet surrounded by air, forming a coflow flame, generating a flame for synthesis of a powder, and collecting the powder downstream of the flame.

In another embodiment, a method of making micrometer-structured cathode materials for Li-ion rechargeable batteries is provided. The method includes synthesizing submicrometer- to micrometer-sized particles with nanostructured features for cathode materials by flame-assisted spray technology to form a powder, and annealing the powder.

In yet another embodiment, spherical particles obtained by dissolving a lithium salt and a metal salt in water or alcohol forming a precursor solution, spraying the precursor solution to form fine aerosolized droplets, and flowing the aerosolized droplets into a pyrolysis flame producing the submicrometer- to micrometer-sized spherical particles are provided.

In yet another embodiment, a nanostructured cathode material for Li-ion rechargeable batteries is provided. The cathode material consisting of submicrometer- to micrometer-sized particles and yields a capacity of at least about 80 mAhg$^{-1}$, and a working voltage between 2.0 and 5 V with Li anode.

In yet another embodiment, spherical particles obtained by dissolving a lithium salt and a metal salt in water or alcohol forming a precursor solution, spraying the precursor solution to form fine aerosolized droplets, flowing the aerosolized droplets into a pyrolysis flame producing the submicrometer- to micrometer—sized spherical particles are provided. The spherical particles are submicrometer- to micrometer-sized. The spherical particles are a spinel lithium manganese oxide suitable as a cathode for Li-ion batteries. The cathodes composed of these spherical particles have a practical capacity of 10-300 mAhg$^{-1}$, and a working voltage between 2.0 and 5.0 V with Li anode.

In an embodiment, to increase the grain size (to improve capacity) and remove impurity phases, the as-synthesized powders are calcined in air for a certain time (1 second to 100 hours), followed by slow or rapid cooling. After this post heat treatment, the annealed powders can be polycrystalline or single crystalline, and they can have a higher capacity at their working potential.

Figure 1:
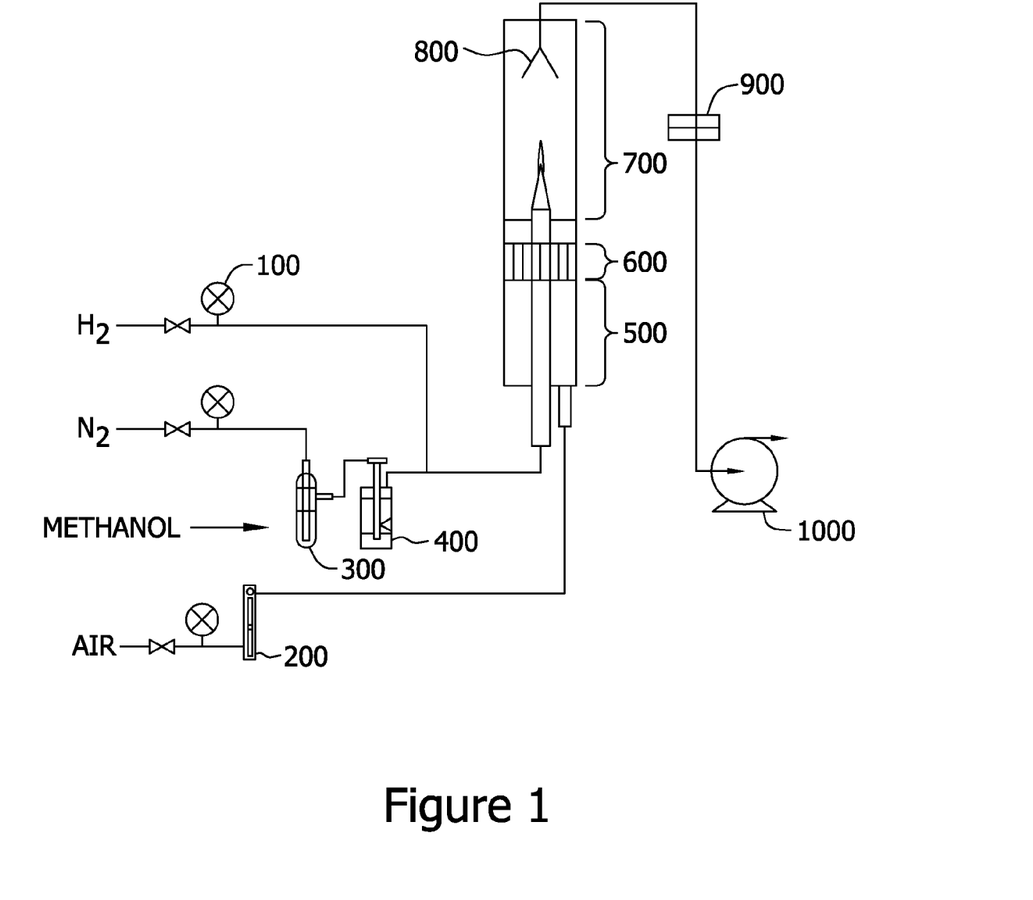
FIG. 1 is a schematic diagram of FAST experimental setup, using a hydrogen flame to synthesize spinel $LiMn_2O_4$.
Figure 2:
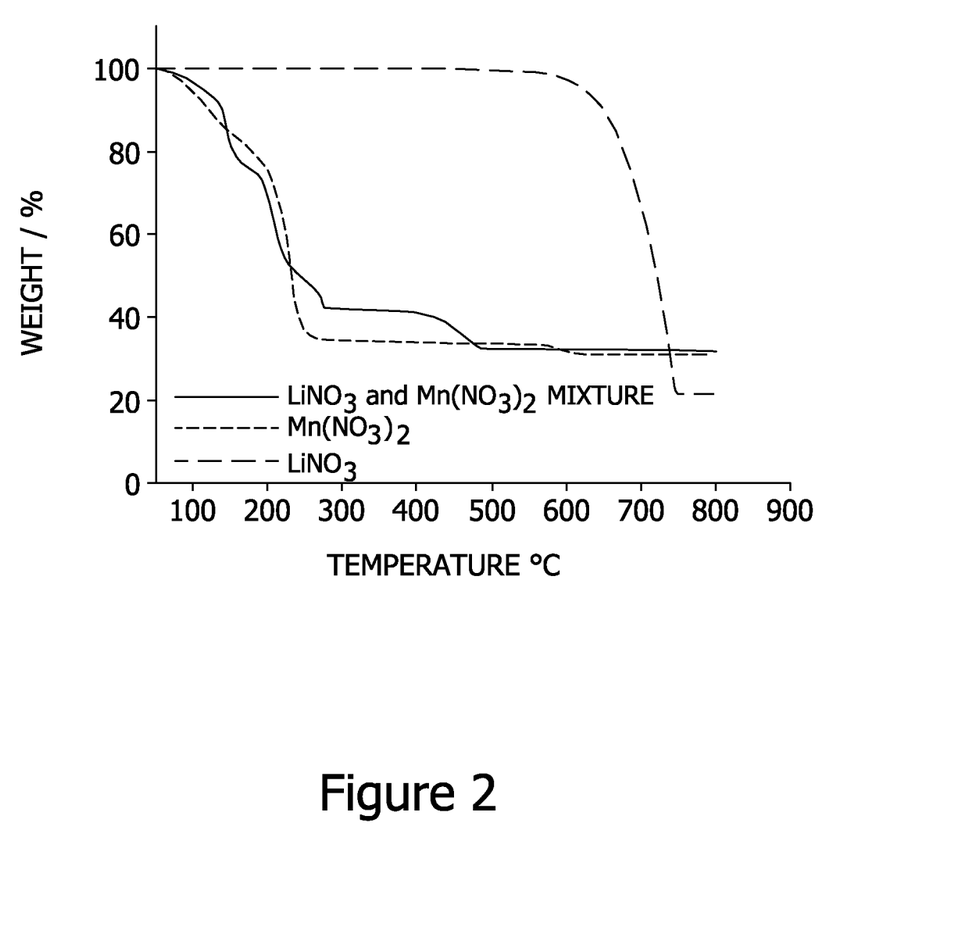
FIG. 2 is a TGA measurements of the individual precursors: $LiNO_3$, and $Mn(NO_3)_2 \cdot 4H_2O$, and their mixture (Li:Mn=1:2).

As shown in FIG. 1, a FAST experimental setup, using a hydrogen flame to synthesize spinel LiMn$_2$O$_4$, comprises an inner jet of a co-flow burner 500, a honeycomb structure 600 surrounding the jet that ensures a uniform flow of air, and an open-ended cylindrical quartz chamber 700, which is used to shield the flame from ambient environment.

The burner 500 had a 10.9 mm inner diameter and was made of 316-stainless steel. A cylindrical quart chamber (inner diameter 50 to 224 mm) 700 was used as a shield around the jet to prevent disturbances from the surroundings. Honeycomb 600 surrounded the jet, ensuring a uniform laminar flow of air in the quartz chamber. The precursor solution was prepared by dissolving LiNO$_3$ (anhydrous, Alfa Aesar), Ni(NO$_3$)$_2$.6H$_2$O (Alfa Aesar) in methanol at a stoichiometric ratio of 1:0.5:1.5. The precursor solution was aerosolized with an atomizer to generate ultra-fine precursor droplets. Methanol-saturated N$_2$ carried the precursor droplets into the flame. Downstream of the flame, the as-synthesized powder was collected in a collection funnel 800 with a Nuclepore Track-etch polycarbonate membrane-filter with a pore size of 0.2 μm 900. The flow rates of H$_2$ and carrier gas N$_2$ were controlled by high-precision flow meters 200. To improve the crystallinity and remove possible impurity-phases, the as-synthesized powders were annealed at 800° C. for 2 hour followed by slow cooling in air at 3.7° C./min.

Figure 3:
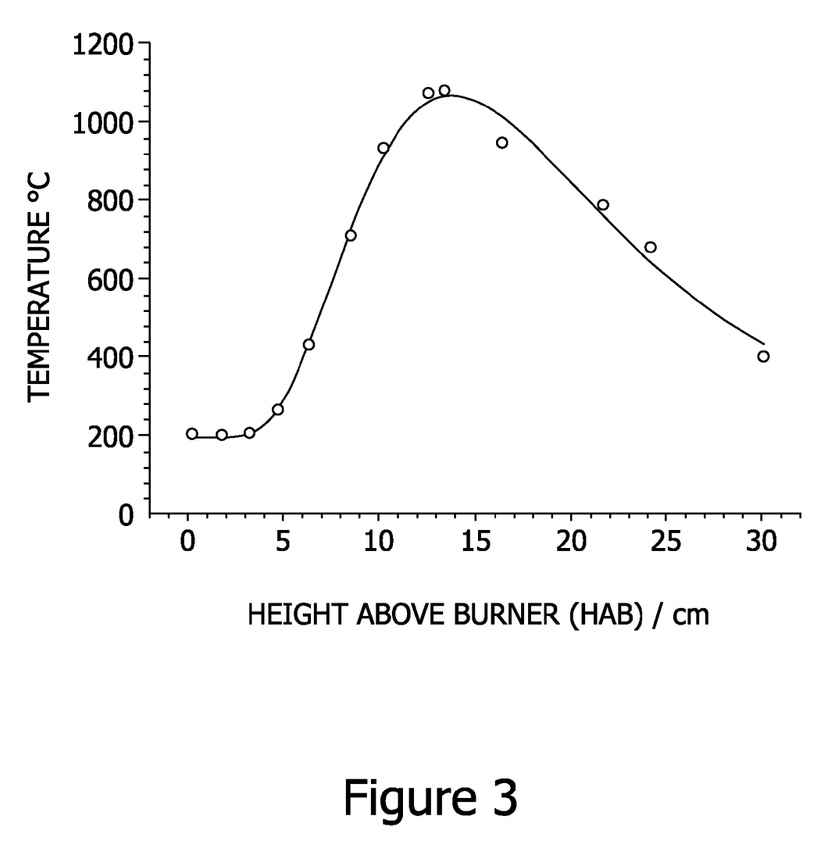
FIG. 3 is measured temperature profile as a function of height above burner (HAB). Temperatures are not corrected for radiative heat loss from the thermocouple.
Figure 4:
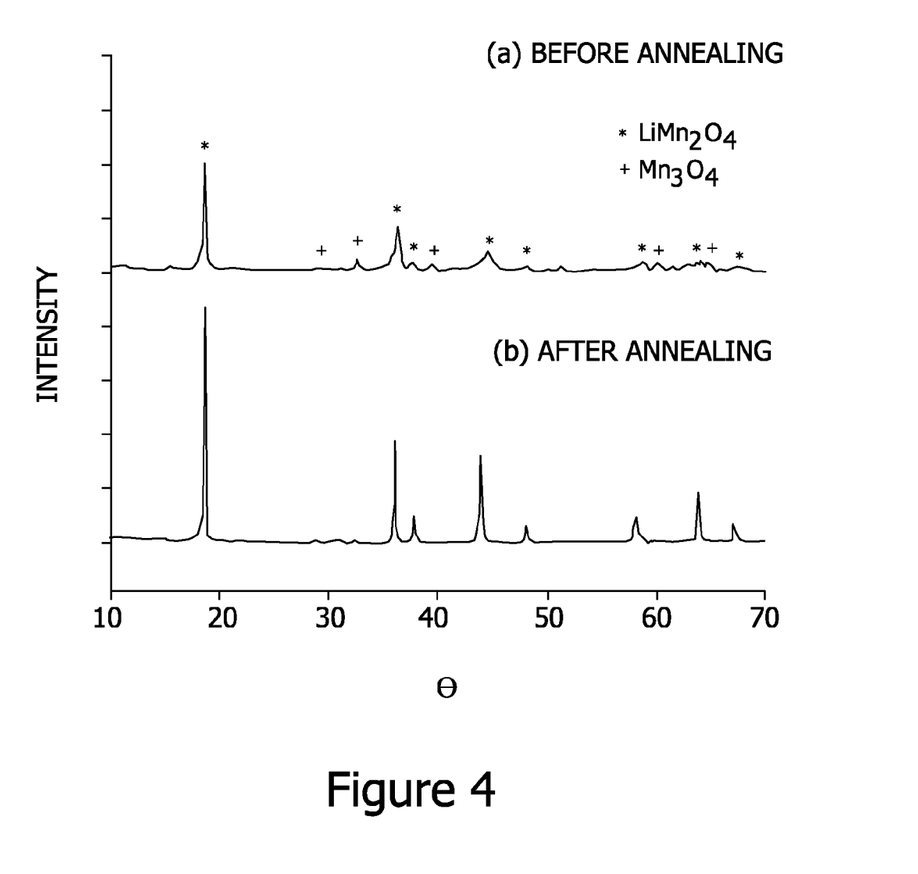
FIG. 4 is the XRD pattern of the flame-synthesized $LiMn_2O_4$ powder before (a) and after (b) annealing 700° C. for 2 hours.
Figure 5A:
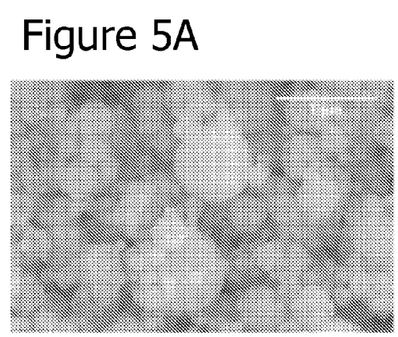
FIG. 5A shows the morphology of the $LiMn_2O_4$ particles: SEM of the flame-synthesized powder before annealing at 700° C. for 2 hours. (SEM: scale bar=1 µm).
Figure 5B:
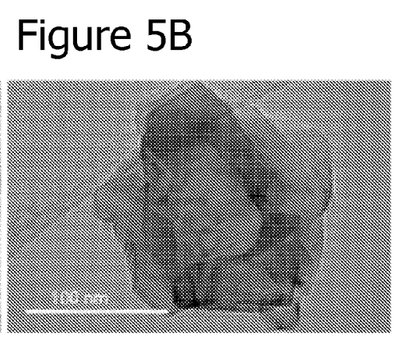
FIG. 5B is a TEM of the flame-synthesized $LiMn_2O_4$ particles before annealing at 700° C. for 2 hours. (TEM: scale bar=100 nm).
Figure 5C:
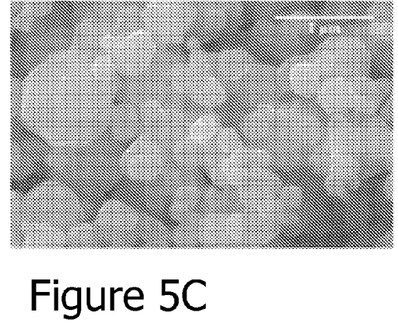
FIG. 5C is an SEM of the flame-synthesized $LiMn_2O_4$ particles after annealing at 700° C. for 2 hours. (SEM: scale bar=1 µm).
Figure 5D:
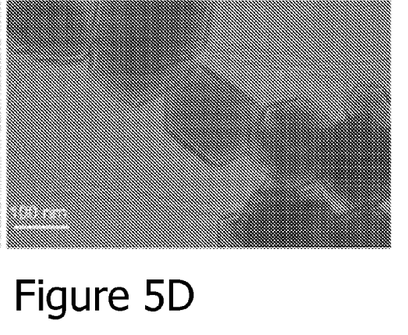
FIG. 5D is a TEM of the flame-synthesized $LiMn_2O_4$ particles after annealing at 700° C. for 2 hours. (TEM: scale bar=100 nm).
Figure 6A:
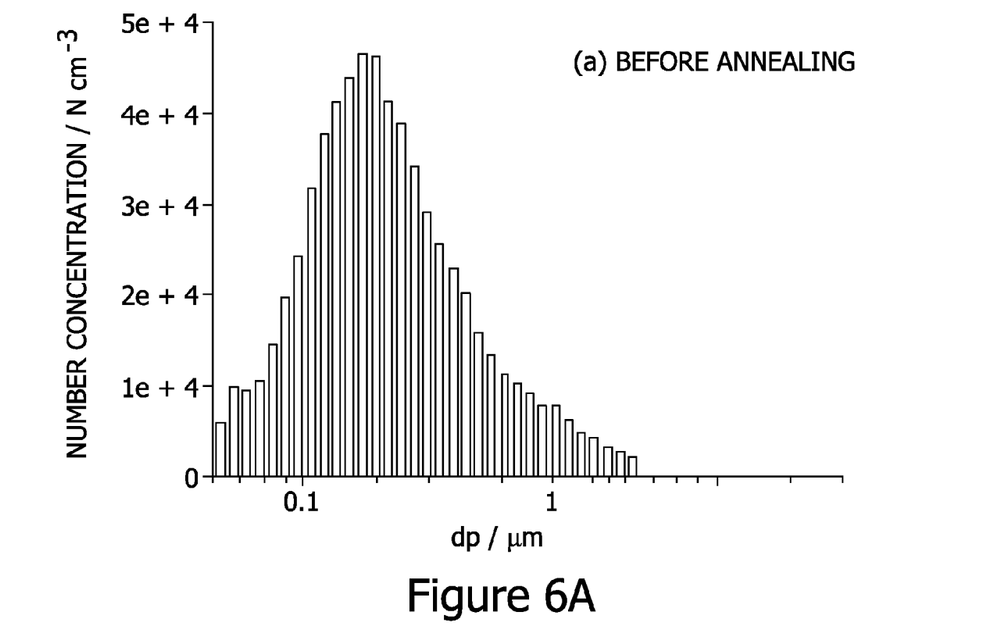
FIG. 6A is the size distribution of the flame-synthesized $LiMn_2O_4$ powder before annealing at 700° C. for 2 hours.
Figure 6B:
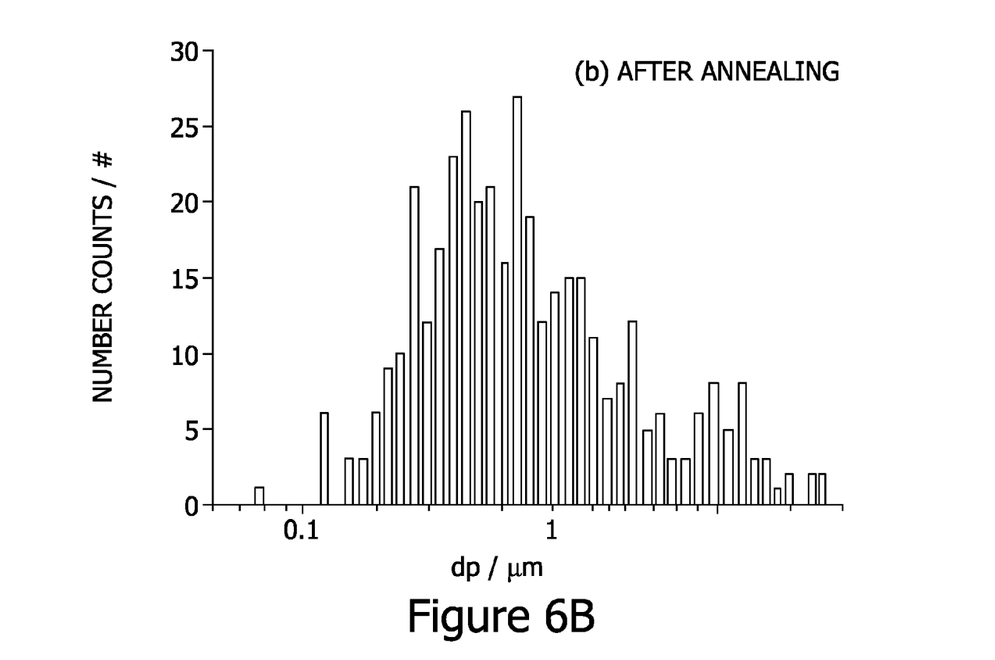
FIG. 6B is the size distribution of the flame-synthesized $LiMn_2O_4$ powder after annealing at 700° C. for 2 hours.
Figure 7A:
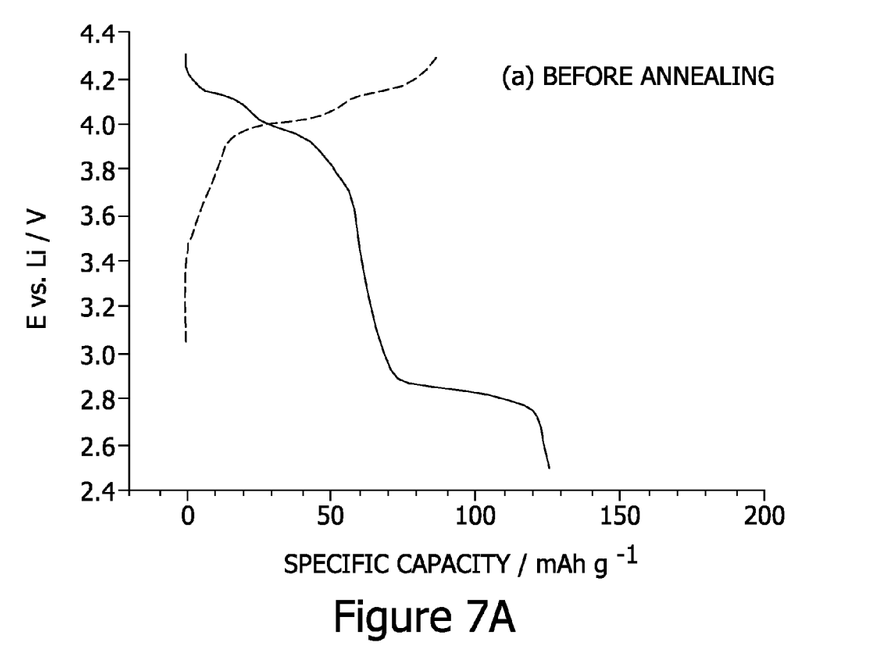
FIG. 7A is the initial charge/discharge of the flame-synthesized $LiMn_2O_4$ powder before annealing at 700° C. for 2 hours (dash line: charge curve; solid line: discharge curve).
Figure 7B:
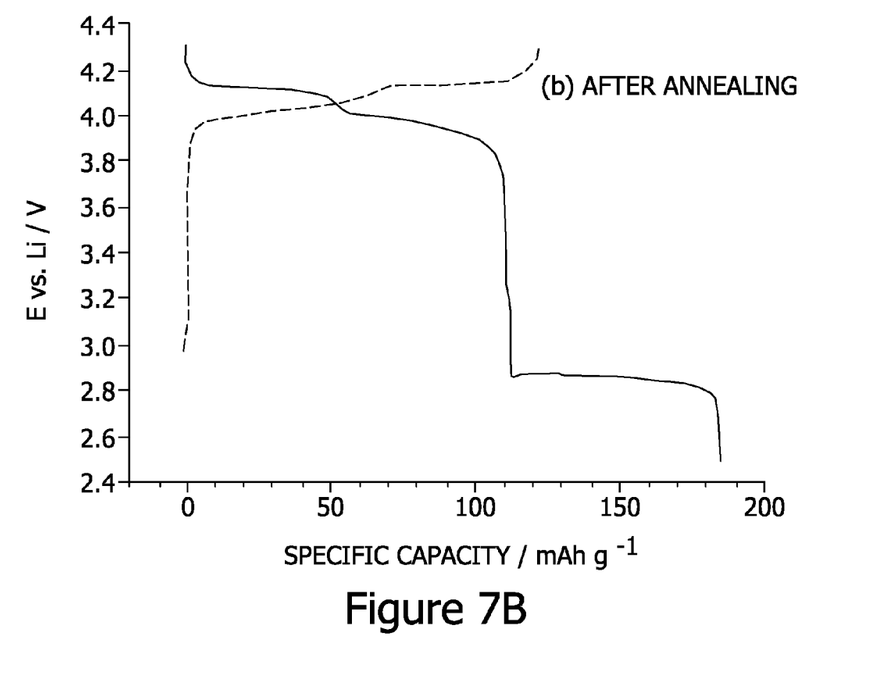
FIG. 7B is initial charge/discharge of the flame-synthesized $LiMn_2O_4$ powder after annealing at 700° C. for 2 hours (dash line: charge curve; solid line: discharge curve).
Figure 8:
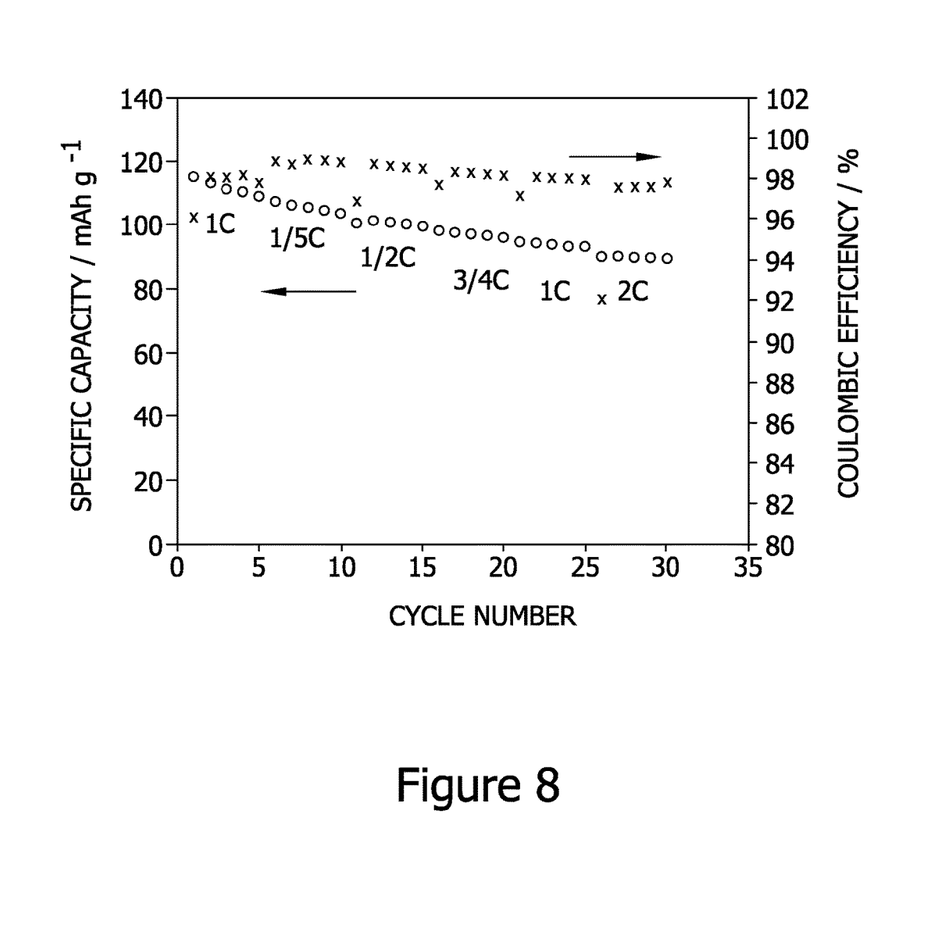
FIG. 8 is the cycle performance of the annealed powder of FIG. 7B with a cut-off voltage of 3.0-4.3 V at an increasing charge/discharge rate. Coulombic efficiency is calculated for each cycle.

The temperature field was measured with a Pt/Rh thermocouple without correction for radiation heat loss. If the thermocouple were inserted into the pyrolysis flame, the deposition of metal oxides on the thermocouple bead would affect the measurement accuracy. Thus, during the measurements of temperature over the entire flame, only pure methanol (i.e., without the metal nitrate precursors) was atomized to form fine methanol droplets, and then delivered into the same hydrogen flame. The measured temperature profile was plotted based on an average of 20 measurements at each point with a precision of ±5° C. The enthalpy required to decompose the precursor nitrates was calculated to be less than 0.3% of the total heat of reaction at standard conditions. Thus, it is expected that the nitrate precursors in the pyrolysis flame would have a negligible effect on flame temperature. Experiment showed that the measured peak temperature of the flame without nitrate precursors was 1205° C. compared to 1155° C. for the flame with precursors at 1.5 cm HAB. A possible explanation for the temperature difference could be the radiative heat loss from the as-synthesized powder. Thus, the H$_2$/methanol flame temperature profile can be considered to be approximately that of the flame producing $LiNi_{0.5}Mn_{1.5}O_4$ powder.

An X-ray diffractometer (Rigaku D-MAX/A Diffractometer) with JADE7 software was used to examine the crystalline structure of the as-synthesized and annealed powders. The Schemer equation was used to calculate the grain size of the powder. Lattice constants and d-spacing were determined by Rietveld cell refinement. The elemental composition of the powder was measured with an inductively-coupled-plasma mass-spectrometer (ICP-MS, Agilent 7500ce). The particle morphology was examined with scanning-electron-microscopy (SEM, JEOL 7001LVF) and transmission-electron-microscopy (TEM, JEOL 2100F).

The synthesized powders were assembled as cathode-active materials into 2032 coin-type test batteries. To prepare the cathodes, a mixture of the $LiNi_{0.5}Mn_{1.5}O_4$ powder, polyvinylidene-fluoride (PVdF) binder, and Super-P conductive-carbon-black at a ratio of 82:10:8 by mass was dissolved in N-methyl-2-pyrrolidene (NMP) and then homogenized to form uniform slurry. The slurry was then cast onto Al foil using the doctor blade technique to form a thin cathode film. The cathode file was dried in a vacuum oven at 130° C. for 16 hours. To improve adhesion, the cathode was calendered, forming a compressed, thin film. Small round cathode discs were punched out from the dry film for the test batteries. The 2032 coin-type test batteries were assembled in an argon-filled glove box. A Li thin foil (FMC Lithium) was employed as an anode and a polypropylene membrane (Celgard 2500) was used as the separator. The electrolyte was 1M $LiPF_6$ in ethylene carbonate/diethyl carbonate solution (EC:DEC=1:1 by weight, Ferro). The electrochemical performance of the cells was tested with a battery-tester at various charge/discharge rates with a cut-off voltage of 3.5 to 4.9 V at a constant temperature of 30° C.

As another example, the precursor was prepared by dissolving stoichiometric quantities (1:2 molar ratio) of $LiNO_3$ and $Mn(NO_3)_2 \cdot 4H_2O$ in methanol. The concentrations of $LiNO_3$ and $Mn(NO_3)_2$ were 0.5 mole $L^{-1}$ and 1.0 mole $L^{-1}$, respectively. The precursor aerosol was generated with an atomizer. The atomizing gas was saturated with methanol vapor prior to entering the atomizer to prevent evaporation of solvent methanol, thus maintaining a constant precursor concentration. The flow rate of $H_2$ and the atomizing gas $N_2$ were kept at 0.5 L $min^{-1}$ and 2.5 L $min^{-1}$, respectively. The flame temperature was measured with a Pt/Rh thermocouple inserted into the flame. To improve the grain sizes and remove impurity phases, the flame-synthesized powder was annealed at 700° C. for 2 hour. The heating rate was 10° C. $min^{-1}$ from room temperature to 700° C., and the cooling rate was 3.3° C.

A characteristic residence time of the precursors/product in the flame reactor can be estimated by assuming the particles follow the flow field and neglecting buoyancy in the flame (if buoyancy is considered, the residence time will be shorter). The length scale is considered to be 30 cm HAB, the temperature was less than 400° C., so sintering of $LiMn_2O_4$ would be negligible. At a total flow rate of 3.0 L $min^{-1}$ ($H_2+N_2$), the characteristic residence time was calculated to be less than 800 milliseconds, which is the shortest synthesis time among current synthesis methods for spinel $LiMn_2O_4$. For ultrasonic spray pyrolysis, sol-gel and solid-state reaction methods, it takes seconds to hours to synthesize crystalline $LiMn_2O_4$ powder. The short formation times were due to the rapid evaporation of solvent methanol, followed by rapid decomposition reactions of the precursors and synthesis reactions of the spinel in the flame. At the high flame temperature, the solvent methanol also reacted as a fuel supporting local heat release at the flame. Thus, the FAST process is a rapid process to make $LiMn_2O_4$ powder continuously with low energy requirements.

Studies have shown that at elevated temperatures, oxygen may be extracted from spinel $LiMn_2O_4$, forming oxygen deficient spinel (J. Electrochem. Soc. 1995, 142, 2149-2156; J. Power Sources 1995, 54, 103-108; J. Electroceram. 2002, 9, 209-214). If the temperature exceeds 1000° C., the spinel would eventually decompose into orthorhombic $LiMnO_2$ and $Mn_3O_4$, and release $O_2$ in an Oxygen extraction reaction (J. Power Sources 1995, 54, 103-108). In the flame, the residence time of the particles in the high temperature range was very short, so only a small portion of spinel $LiMn_2O_4$ powder decomposed into $Mn_3O_4$ in the flame. Nonetheless, a post-annealing treatment was necessary to remove the impurity in the flame-synthesized spinel $LiMn_2O_4$.

After annealing the as-synthesized powder at 700° C. for 2 hours, the XRD (X-Ray Diffraction) pattern was a good match to the single-phase spinel $LiMn_2O_4$ with a space group $Fd\bar{3}m$. No $Mn_3O_4$ impurity was detectable in the XRD spectrum. The crystallinity of the powder was also greatly improved, as indicated by the sharper XRD peaks. After Rietveld cell refinement, the lattice parameter a of the annealed powder was 8.234 Å, which is in good agreement with spinel $LiMn_2O_4$. The average grain size of the annealed powder was 0.033 micrometer, as estimated by the Schemer formula (fwhm=0.268°, 2-Theta—43.981°, $\lambda_{Cu/K-\alpha 1}$=1.54 Å).

Finally, a flame method, flame-assisted spray technology (FAST), is invented to synthesize $LiMn_2O_4$ and its derivatives (i.e., $LiNi_{0.5}Mn_{1.5}O_4$) powders continuously, with sub-micrometer- to micrometer-size, and uniform morphology. In the process, a fuel (for example, $H_2$) is used as primary fuel and metal nitrates dissolved in methanol are employed as precursors. Methanol is selected as solvent of the precursor solution. Methanol is combustible, thus it can be considered as a secondary fuel. The solution of lithium, manganese and nickel precursors is aerosolized by $N_2$ (or air or other gas) and then mixed with $H_2$. The mixture of fuels, precursors and atomizing gas is then introduced into air in a coflow. In this configuration, a flame is generated for the synthesis of the powders. The powders can be collected downstream of the flame. By optimizing the flame parameter and precursor solution, undesired impurities are reduced. In the flame, the exothermic reaction between fuel and oxidizer generates heat to create a high temperature environment. Thus, it does not require external heating, and the heating is volumetric in flames. The residence time of the precursors in the flame is about less than half a second. The invented flame process has shown the ability to produce powders rapidly, with low energy input.

The as-synthesized submicrometer- to micrometer-sized powders are electrochemically active as cathode materials for Li-ion batteries.

Using FAST process, the $LiMn_2O_4$ powders have shown good electrochemical performance as a 4 V cathode material. However, capacity fading, an irreversible capacity loss, of $LiMn_2O_4$ is still observed. In another embodiment, to overcome the fading, Mn is partially substituted with Ni, forming submicrometer- to micrometer-sized $LiNi_{0.5}Mn_{1.5}O_4$. For example, after 30 cycles at 0.1 C rate (1C=148 $mAhg^{-1}$), the $LiNi_{0.5}Mn_{1.5}O_4$ cathode can show only about 2.5% capacity loss compared to 26.5% capacity loss of $LiMn_2O_4$, after post heat treatment. Even at a higher charge/discharge rates, $LiNi_{0.5}Mn_{1.5}O_4$ has an increased capacity retention over $LiMn_2O_4$.

In summary, submicrometer- to micrometer-sized spinel LiMn$_2$O$_4$ and LiNi$_{0.5}$Mn$_{1.5}$O$_4$ cathode materials for Li-ion batteries were synthesized using flame-assisted spray technology (FAST). Both of these materials have shown comparable results to those from other synthesis methods. Moreover, LiNi$_{0.5}$Mn$_{1.5}$O$_4$ from FAST has much higher capacity retention than LiMn$_2$O$_4$ over a wide range of charge/discharge rates.

This written description uses examples to disclose the embodiments of the disclosure, including the best mode, and also to enable any person skilled in the art to practice embodiments of the disclosure, including making and using any devices or systems and performing any incorporated methods. The patentable scope of embodiments of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the elements.

As various changes could be made in the above disclosure without departing from the scope of the disclosure; it is intended that all matter contained in the above description shall be interpreted as illustrative and not in a limiting sense.

What is claimed is:

1. A method of producing submicrometer- to micrometer-sized, spherical-shaped cathode materials for lithium ion batteries, the method comprising:
    dissolving a lithium salt and a metal salt in water, alcohol, oil or a mixture of any two or more thereof, forming a lithium metal precursor solution,
    spraying the precursor solution to form fine aerosolized droplets,
    flowing the aerosolized droplets in a carrier medium into a pyrolysis hydrogen flame producing submicrometer- to micrometer-sized spherical lithium-metal-oxide particles in a range of from about 0.1 μm to about 100 μm, wherein no external heat source is required, and wherein the droplets are flowing in an environment having a temperature of less than 1200° C., wherein the submicrometer- to micrometer-sized spherical-shaped lithium-metal-oxide particles produced have a formula of Li$_\alpha$M'$_\beta$O$_\gamma$ wherein α is 0≤α≤1; β is 0≤β≤2; and γ is 0≤γ≤4; and wherein M' is selected from the group consisting of Ni, Co, Mn, Al, Mg, Fe, Cu, Zn, V, Mo, Nb, Cr, Si, Ti, Zr, and a mixture of any two or more thereof.

2. The method of claim 1, wherein the submicrometer- to micrometer-sized spherical lithium-metal-oxide particles are polycrystalline or single crystalline, and wherein the submicrometer- to micrometer-sized spherical lithium-metal-oxide particles are small primary particles.

3. The method of claim 1, wherein the lithium salt is selected from the group consisting of lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, lithium phosphate, and a mixture of any two or more thereof.

4. The method of claim 1, wherein the metal salt has a general formula of M'$_\delta$X'$_\epsilon$;
    wherein X' is selected from a group consisting of NO$_3^-$, SO$_4^{2-}$, CO$_3^{2-}$, PO$_4^{3-}$, F$^-$, Cl$^-$, Br$^-$, I$^-$, and a mixture of any two or more thereof; and
    wherein δ is 0<δ≤3; and ε is 0<ε≤3.

5. The method of claim 1, wherein the carrier medium is a gas selected from the group consisting of N$_2$, O$_2$, Ar, He, Ne, Xe, Kr, H$_2$, SO$_2$, NO$_2$, NO$_3$, O$_3$, CO$_2$, CO, H$_2$O, C$_a$H$_b$O$_c$N$_d$ and a mixture of any two or more thereof.

6. The method of claim 1, wherein the method is continuous.

7. The method of claim 1, wherein the submicrometer- to micrometer-sized spherical lithium-metal-oxide particles can be calcined at a temperature between 400° C. and 1200° C. for a certain time between 1 second to 100 hours, followed by slow or rapid cooling.

8. The method of claim 1, wherein about 50% of the submicrometer- to micrometer-sized lithium-metal-oxide particles produced are spherical.

9. The method of claim 1, wherein about 80% of the submicrometer- to micrometer-sized lithium-metal-oxide particles produced are spherical.

10. A method of continuously producing submicrometer- to micrometer-sized particles that are suitable for a Li-ion battery cathode, the method comprising:
    dissolving lithium and other metal salt (or salts) in water or alcohol to make a precursor solution,
    spraying or aerosolizing the precursor solution to form fine droplets; and
    flowing the fine droplets into a pyrolysis hydrogen flame, wherein the fine droplets transform into submicrometer to micrometer-sized spherical lithium-metal-oxide particles in a range of from about 0.1 μm to about 100 μm, wherein no external heat source is required, and wherein the droplets are flowing in an environment having a temperature of less than 1200° C., wherein the submicrometer- to micrometer-sized spherical-shaped lithium-metal-oxide particles produced have a formula of Li$_\alpha$M'$_\beta$O$_\gamma$ wherein α is 0≤α≤1; β is 0≤β≤2; and γ is 0≤γ≤4; and wherein M' is selected from the group consisting of Ni, Co, Mn, Al, Mg, Fe, Cu, Zn, V, Mo, Nb, Cr, Si, Ti, Zr, and a mixture of any two or more thereof.

11. The method of claim 10, wherein the submicrometer- to micrometer-sized spherical lithium-metal-oxide particles produced are spinel lithium manganese oxide.

12. The method of claim 10, wherein the lithium salt is a lithium nitrate, and wherein the metal salt is a manganese nitrate.

13. The method of claim 10, wherein about 50% of the submicrometer- to micrometer-sized lithium-metal-oxide particles produced are spherical.

14. The method of claim 10, wherein about 80% of the submicrometer- to micrometer-sized lithium-metal-oxide particles produced are spherical.

15. Submicrometer- to micrometer-sized spherical particles obtained by a method comprising:
    dissolving a lithium salt and a metal salt (or metal salts) in water or alcohol forming a precursor solution containing Li and other metal (or metals),
    spraying the precursor solution to form fine aerosolized droplets, and
    flowing the aerosolized droplets into a pyrolysis hydrogen flame producing the submicrometer- to micrometer-sized spherical lithium-metal-oxide particles in a range of from about 0.1 μm to about 100 μm, wherein no external heat source is required, and wherein the droplets are flowing in an environment having a temperature of less than 1200° C., wherein the submicrometer- to micrometer-sized spherical-shaped lithium-metal-oxide particles produced have a formula of $Li_\alpha M'_\beta O_\gamma$ wherein $\alpha$ is $0 \le \alpha 1$; $\beta$ is $0 \le \beta \le 2$; and $\gamma$ is $0 \le \gamma \le 4$; and wherein M' is selected from the group consisting of Ni, Co, Mn, Al, Mg, Fe, Cu, Zn, V, Mo, Nb, Cr, Si, Ti, Zr, and a mixture of any two or more thereof.

16. The submicrometer- to micrometer-sized spherical particles obtained from the method of claim 15, wherein the submicrometer- to micrometer-sized spherical lithium-metal-oxide particles obtained are a spinel lithium manganese oxide suitable as a cathode of a Li-ion battery.

17. The submicrometer- to micrometer-sized spherical particles of claim 15 comprising:
   a practical capacity of 10-300 $mAhg^{-1}$, and
   a working voltage between 2.0 and 5.0 V with Li anode.

18. The method of claim 1, wherein the droplets are flowing in an environment having a temperature of less than 1000° C.

19. The method of claim 10, wherein the droplets are flowing in an environment having a temperature of less than 1000° C.

20. The submicrometer- to micrometer-sized spherical particles of claim 15, wherein the droplets are flowing in an environment having a temperature of less than 1000° C.

* * * * *

UNITED STATES PATENT AND TRADEMARK OFFICE
CERTIFICATE OF CORRECTION

PATENT NO. : 10,193,132 B2
APPLICATION NO. : 13/811448
DATED : January 29, 2019
INVENTOR(S) : Richard Louis Axelbaum et al.

Page 1 of 1

It is certified that error appears in the above-identified patent and that said Letters Patent is hereby corrected as shown below:

In the Specification

Column 7, Line 6, delete "Schemer equation" and insert therefor -- Scherrer equation --.

Signed and Sealed this
Fourth Day of June, 2019

Andrei Iancu
*Director of the United States Patent and Trademark Office*